United States Patent
Nagayasu

(10) Patent No.: US 9,597,985 B2
(45) Date of Patent: Mar. 21, 2017

(54) CONVEYANCE SEAT

(71) Applicant: TOYOTA BOSHOKU KABUSHIKI KAISHA, Aichi-ken (JP)

(72) Inventor: Hidetaka Nagayasu, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 206 days.

(21) Appl. No.: 14/596,667

(22) Filed: Jan. 14, 2015

(65) Prior Publication Data

US 2015/0197167 A1     Jul. 16, 2015

(30) Foreign Application Priority Data

Jan. 15, 2014     (JP) ................................. 2014-005016

(51) Int. Cl.
*B60N 2/36*     (2006.01)

(52) U.S. Cl.
CPC ....................................... *B60N 2/36* (2013.01)

(58) Field of Classification Search
CPC ....................................................... B60N 2/36
USPC ............. 297/33, 353, 376, 354.1, 378.1, 94,
297/378.11–378.14; 5/47; 296/65.09
See application file for complete search history.

(56) References Cited

U.S. PATENT DOCUMENTS

| | | | | |
|---|---|---|---|---|
| 2,160,482 A | * | 5/1939 | McGregor | B60N 2/20 297/378.1 |
| 2,352,375 A | * | 6/1944 | Fox | A47C 17/1756 5/47 |
| 3,540,777 A | * | 11/1970 | De Beaumont | B60N 2/0284 297/284.4 |
| 5,308,142 A | * | 5/1994 | Forslund, III | A47C 7/445 297/286 |
| 5,308,145 A | * | 5/1994 | Koepke | A47C 1/03255 297/316 |
| 6,474,737 B1 | * | 11/2002 | Canteleux | B60N 2/0292 297/321 |
| 6,715,825 B2 | * | 4/2004 | Tame | B60N 2/34 297/101 |
| 2009/0230747 A1 | * | 9/2009 | Maier | B60N 2/3031 297/378.1 |
| 2011/0115273 A1 | * | 5/2011 | Epaud | B60N 2/3031 297/378.1 |

FOREIGN PATENT DOCUMENTS

| | | |
|---|---|---|
| JP | 5-65658 | 8/1993 |
| JP | 3067910 | 1/2000 |
| JP | 2002-274235 | 9/2002 |

\* cited by examiner

*Primary Examiner* — Syed A Islam
(74) *Attorney, Agent, or Firm* — Greenblum & Bernstein, P.L.C.

(57) ABSTRACT

A conveyance seat includes a seat back; a seat cushion; a first link member; and a second link member. The floor or the seat cushion is connected to the seat back by the first and second link members. The first link member is shorter than the second link member. The seat back is able to be moved in a front-rear direction such that the first link member and the second link member do not intersect with each other. The seat back is able to be laid on or over the seat cushion such that the first link member and the second link member intersect with each other. A lock device is provided, and the lock device stops movement of the seat back while the seat back is moved in the front-rear direction such that the first link member and the second link member do not intersect with each other.

6 Claims, 4 Drawing Sheets

CONVEYANCE SEAT

INCORPORATION BY REFERENCE

The disclosure of Japanese Patent Application No. 2014-005016 filed on Jan. 15, 2014 including the specification, drawings and abstract is incorporated herein by reference in its entirety.

BACKGROUND OF THE INVENTION

1. Field of the Invention

The invention relates to a conveyance seat provided in a conveyance such as a vehicle, an airplane, a ship, or a train.

2. Description of Related Art

An example of a conveyance seat is a rear seat that is provided such that a floor of a storage compartment is provided behind the rear seat and the storage compartment is able to be enlarged. In the conveyance seat described in Japanese Patent Application Publication No. 2002-274235A, a seat cushion is attached to a support shaft such that the seat cushion is rotatable in a front-rear direction about the support shaft that is provided at a front lower end of the seat cushion to extend in a right-left direction, and a seat back is attached to a support shaft such that the seat back is rotatable in the front-rear direction about the support shaft that is provided at a front end of the floor of the storage compartment to extend in the right-left direction. In order to enlarge the storage compartment, the seat cushion is rotated forward about the support shaft such that the seat cushion is stored and a space is formed, and then, the seat back is tilted forward into the space such that a back surface of the seat back is flush with the floor of the storage compartment. Thus, the storage compartment is enlarged.

In the case of the above-described conveyance seat, when the storage compartment is enlarged, the seat cushion of the seat is rotated forward and the seat back is tilted into the space where the seat cushion was disposed before being rotated forward. Therefore, when the storage compartment is enlarged, an occupant cannot be seated on the seat.

SUMMARY OF THE INVENTION

The invention provides a conveyance seat that makes it possible for an occupant to enlarge a storage compartment provided behind the seat while the occupant is seated on the seat.

A conveyance seat according to an aspect of the invention includes a seat back; a seat cushion; a first link member whose one end is attached to a floor or a rear portion of the seat cushion such that the first link member is rotatable, and whose other end is attached to a lower portion of the seat back such that the first link member is rotatable; and a second link member whose one end is attached to the floor or the rear portion of the seat cushion such that the second link member is rotatable, and whose other end is attached to the lower portion of the seat back such that the second link member is rotatable, the second link member being provided in a position behind the first link member. The floor or the seat cushion is connected to the seat back by the first link member and the second link member. The first link member is shorter than the second link member. The seat back is able to be moved in a front-rear direction such that the first link member and the second link member do not intersect with each other. The seat back is able to be laid on or over the seat cushion such that the first link member and the second link member intersect with each other. A lock device is provided, and the lock device stops movement of the seat back while the seat back is moved in the front-rear direction such that the first link member and the second link member do not intersect with each other. According to the above-described aspect, the seat back is connected to the floor or the seat cushion via the two links, and therefore, a four-bar linkage is formed. Accordingly, it is possible to move the seat back forward such that the inclination of the seat back with respect to the seat cushion is hardly changed from the inclination of the seat back in a normal state. Thus, it is possible for an occupant to enlarge a storage compartment behind the seat while the occupant is seated on the seat.

In the above-described aspect, the lock device may include strikers provided in a vehicle body or the seat back, and a lock mechanism that is engaged with each of the strikers, the lock mechanism being provided in the vehicle body or the seat back. According to the above-described aspect, it is possible to lock the seat back with a simple structure including the strikers and the lock mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIG. 1 to FIG. 4 are views each showing an embodiment of the invention. The embodiment is an example in which the invention is applied to a rear seat for a vehicle that has a storage compartment (i.e., a luggage compartment) provided in a rear portion of the vehicle (hereinafter, the rear seat for the vehicle may be simply referred to as "rear seat"). In each figure, arrows indicate directions with respect to the vehicle when the rear seat for the vehicle is installed on the floor. Hereinafter, descriptions regarding the directions will be made based on the directions indicated by the arrows in each figure.

Figure 1:
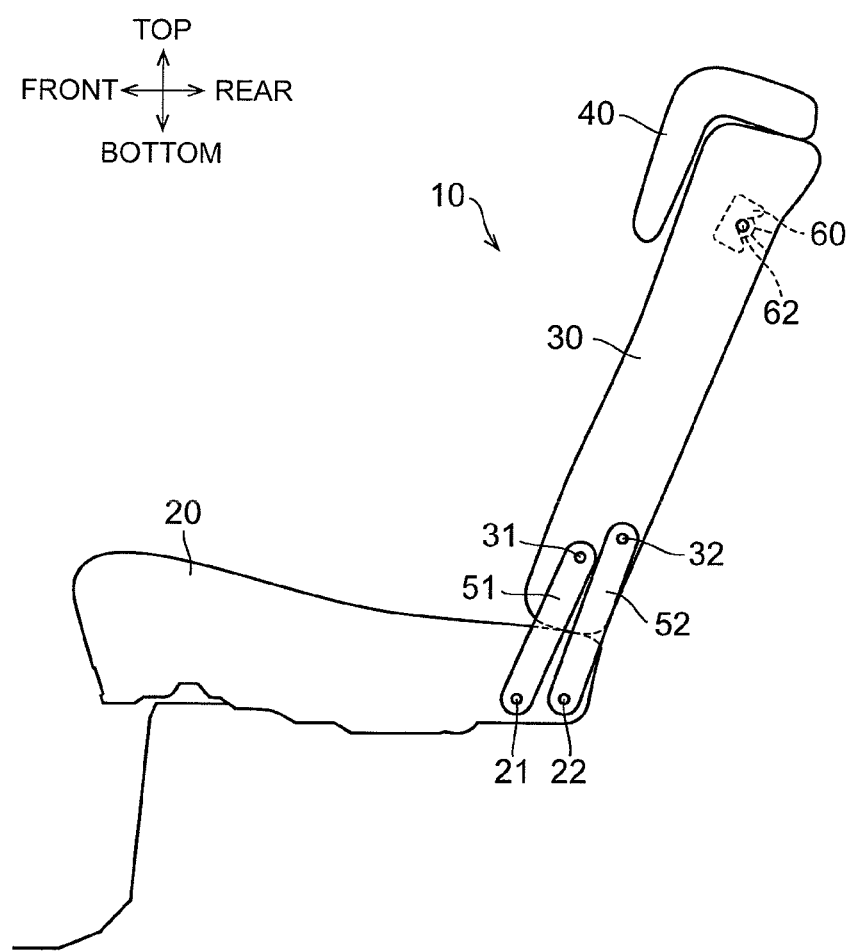
FIG. 1 is a view illustrating a normal seating state in an embodiment of the invention.

As shown in FIG. 1, a rear seat 10 in the embodiment includes a seat cushion 20 and a seat back 30. The seat cushion 20 has a structure in which a cushion pad that is a cushion material is disposed on a cushion frame formed of metal, and the cushion pad is covered with a cushion cover formed of fabric, leather, or the like. The seat back 30 has a structure in which a back pad that is a cushion material is disposed on a back frame formed of metal, and the back pad is covered with a back cover formed of fabric, leather, or the like. A headrest 40 is fitted to an upper portion of the seat back 30.

The seat cushion 20 is connected to the seat back 30 by a first link member 51 and a second link member 52. The first link member 51 is formed of a steel plate. An upper end portion of the first link member 51 is attached to a support shaft 31 provided in a lower portion of the seat back 30 such that the first link member 51 is rotatable. A lower end portion of the first link member 51 is attached to a support shaft 21 provided in a rear portion of the seat cushion 20 such that the first link member 51 is rotatable. The second link member 52 is formed of a steel plate. An upper end portion of the second link member 52 is attached to a support shaft 32 provided in the lower portion of the seat back 30 such that the second link member 52 is rotatable. A lower end portion of the second link member 52 is attached to a support shaft 22 provided in the rear portion of the seat cushion 20 such that the second link member 52 is rotatable. The second link member 52 is longer than the first link member 51. The second link member 52 is provided behind the first link member 51 (i.e., a position in which the second link member 52 is provided is behind a position in which the first link member 51 is provided). That is, in the rear portion of the seat cushion 20, the support shaft 22 for the second link member 52 is provided behind the support shaft 21 for the first link member 51. In the lower portion of the seat back 30, the support shaft 32 for the second link member 52 is provided behind and above the support shaft 31 for the first link member 51. Further, the second link member 52 is provided outside the first link member 51 in a right-left direction of the rear seat 10. Accordingly, the first link member 51 and the second link member 52 are able to rotate, without interfering with each other. Accordingly, the first link member 51 and the second link member 52 are able to rotate such that the first link member 51 and the second link member 52 intersect with each other when viewed from a side (i.e., the first link member 51 and the second link member 52 intersect with each other in a side view).

A lock mechanism 60 is provided in an upper portion of a side of the seat back 30, the side being close to a wall surface of a vehicle body. The lock mechanism 60 is a known lock mechanism. The lock mechanism 60 includes a base plate, a latch, and a pawl. The base plate has a recessed portion, and each of strikers provided in the vehicle body is received in the recessed portion. The striker is held between the recessed portion and the latch. The latch is maintained in a locked state by the pawl. More specifically, strikers 61, 62 are provided in the vehicle body. Each of the strikers 61, 62 is engaged with the lock mechanism 60 provided in the seat back 30 to stop the movement of the seat back 30. The striker 61 and the striker 62 are positioned at the same height in an up-down direction. The striker 61 is provided ahead of the striker 62. As described later, a state in which the lock mechanism 60 in the seat back 30 is engaged with the striker 62 is a normal seating state. A state in which the lock mechanism 60 is engaged with the striker 61 is a storage compartment enlargement state in which a space of the storage compartment is enlarged by moving the seat back 30 forward (toward a front side). The striker 61 is movable to a position at which the striker 61 is engaged with the lock mechanism 60, and to a position at which the striker 61 does not interfere with the lock mechanism 60. The striker 62 is movable to a position at which the striker 62 is engaged with the lock mechanism 60, and to a position at which the striker 62 does not interfere with the lock mechanism 60. Thus, when the seat back 30 is rotated to engage the lock mechanism 60 with the striker 61, the striker 62 does not interfere with the rotation of the seat back 30. When the seat back 30 is rotated to engage the lock mechanism 60 with the striker 62, the striker 61 does not interfere with the rotation of the seat back 30.

The rear seat 10 with the above-described configuration in the embodiment is operated as follows. As shown in FIG. 1, when the rear seat 10 is in the normal seating state, that is, when the seat back 30 is at a normal position, both of the first link member 51 and the second link member 52 are tilted rearward when viewed from the side (i.e., both of the first link member 51 and the second link member 52 are tilted rearward in the side view). That is, the first link member 51 is in a state in which the support shaft 31 provided in the seat back 30 is positioned behind and above the support shaft 21 provided in the seat cushion 20. Similarly, the second link member 52 is in a state in which the support shaft 32 provided in the seat back 30 is positioned behind and above the support shaft 22 provided in the seat cushion 20. The lock mechanism 60 provided in the seat back 30 is engaged with the striker 62 provided in the vehicle body, while the first link member 51 and the second link member 52 are in the above-described positional state. Thus, the seat back 30 is fixed at the position in the normal seating state (i.e., at the normal position), and accordingly, the size of the storage compartment is set to a normal size, and the area of the seating surface of the seat cushion 20 is set to a normal area.

Figure 2:
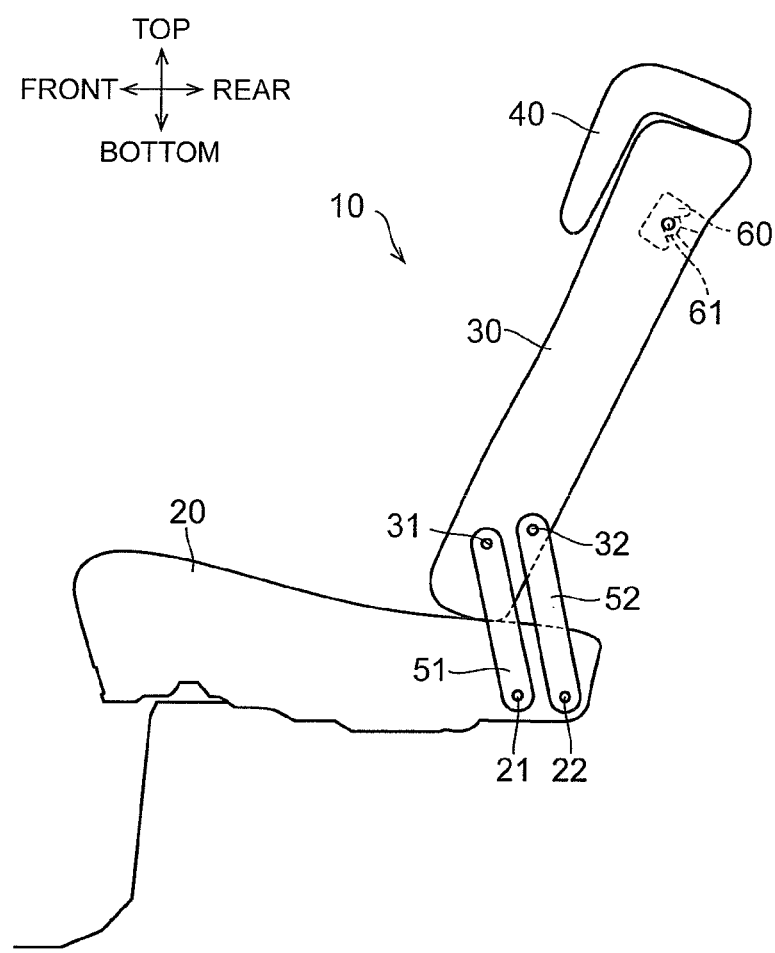
FIG. 2 is a view illustrating a state in which a storage compartment is enlarged in the embodiment.

The state of the rear seat 10 is changed from the state shown in FIG. 1 to the state shown in FIG. 2 by unlocking the lock mechanism 60 provided in the seat back 30, rotating the first link member 51 and the second link member 52 forward, moving the seat back 30 forward, and engaging the lock mechanism 60 provided in the seat back 30 with the striker 61 provided in the vehicle body. When the rear seat 10 is in the state shown in FIG. 2, that is, when the storage compartment is enlarged by moving the seat back 30 forward and engaging the lock mechanism 60 with the striker 61, both of the first link member 51 and the second link member 52 are tilted forward when viewed from the side (i.e., both of the first link member 51 and the second link member 52 are tilted forward in the side view). That is, the first link member 51 is in a state in which the support shaft 31 provided in the seat back 30 is positioned ahead and above the support shaft 21 provided in the seat cushion 20. Similarly, the second link member 52 is in a state in which the support shaft 32 provided in the seat back 30 is ahead and above the support shaft 22 provided in the seat cushion 20. The lock mechanism 60 provided in the seat back 30 is engaged with the striker 61 provided in the vehicle body, while the first link member 51 and the second link member 52 are in the above-described positional state. Thus, the seat back 30 is fixed at a position ahead of the position of the seat back 30 in the normal seating state. The size of the storage compartment is enlarged by an amount corresponding to movement of the seat back 30. The area of the seating surface of the seat cushion 20 is reduced by an amount corresponding to the movement of the seat back 30. In this state, although the comfort for a seated occupant is slightly reduced, the storage compartment is enlarged, and it is possible to satisfy a demand for making it possible for an occupant to enlarge the storage compartment while the occupant is seated on the seat. The demand is not satisfied in related art.

Figure 3:
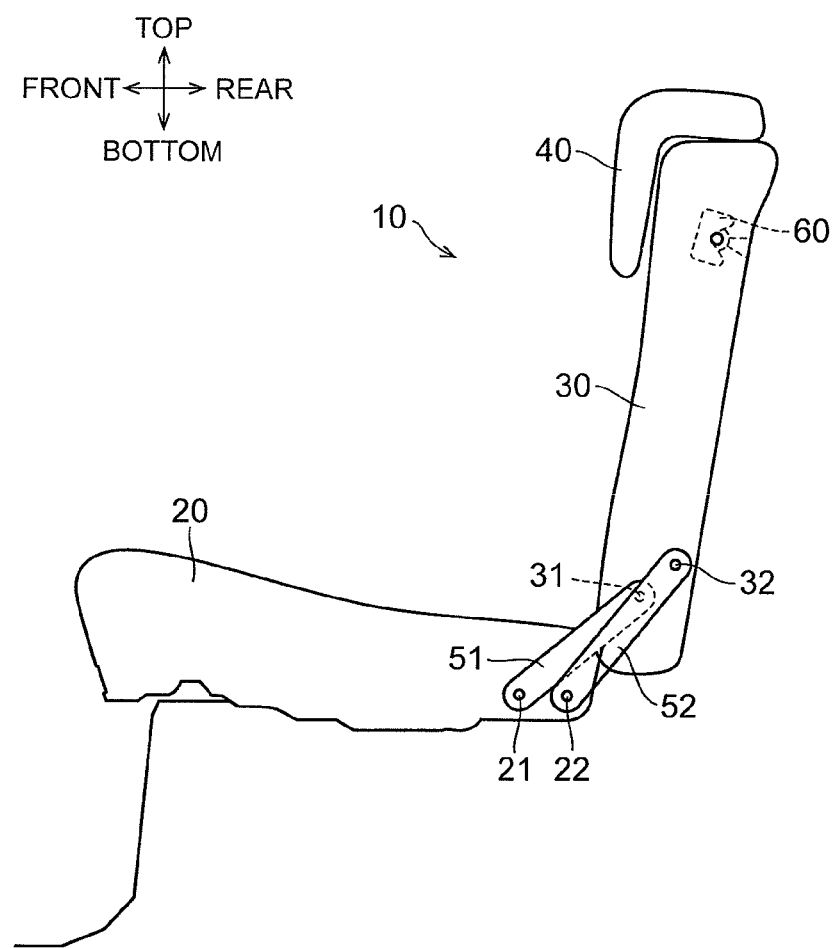
FIG. 3 is a view illustrating a process of laying a seat back over a seat cushion.

When the lock mechanism 60 provided in the seat back 30 is unlocked, and the seat back 30 is moved rearward (toward a rear side) from the normal seating state shown in FIG. 1 or the storage compartment enlargement state shown in FIG. 2, the seat back 30 is rotated forward and is brought to a state shown in FIG. 3. After the seat back 30 is brought to the state shown in FIG. 3, the seat back 30 is not moved rearward any further. At this time, the support shaft 21 that supports the first link member 51 with respect to the seat cushion 20, the support shaft 31 that supports the first link member 51 with respect to the seat back 30, and the support shaft 32 that supports the second link member 52 with respect to the seat back 30 are aligned on one straight line. If the first link member 51 and the second link member 52 were to be further tilted rearward from the state shown in FIG. 3, a distance between virtual paths, on which the support shaft 31 and the support shaft 32 would respectively move, would be larger than a distance between the support shaft 31 and the support shaft 32. Accordingly, the first link member 51 and the second link member 52 cannot be further tilted rearward from the positions shown in FIG. 3. It is possible to adjust the positions from which the first link member 51 and the second link member 52 cannot be further tilted rearward, by changing the lengths of the first link member 51 and the second link member 52, and the positions at which the first link member 51 and the second link member 52 are attached to the seat cushion 20 and the seat back 30 (i.e., the positions of the support shafts).

Figure 4:
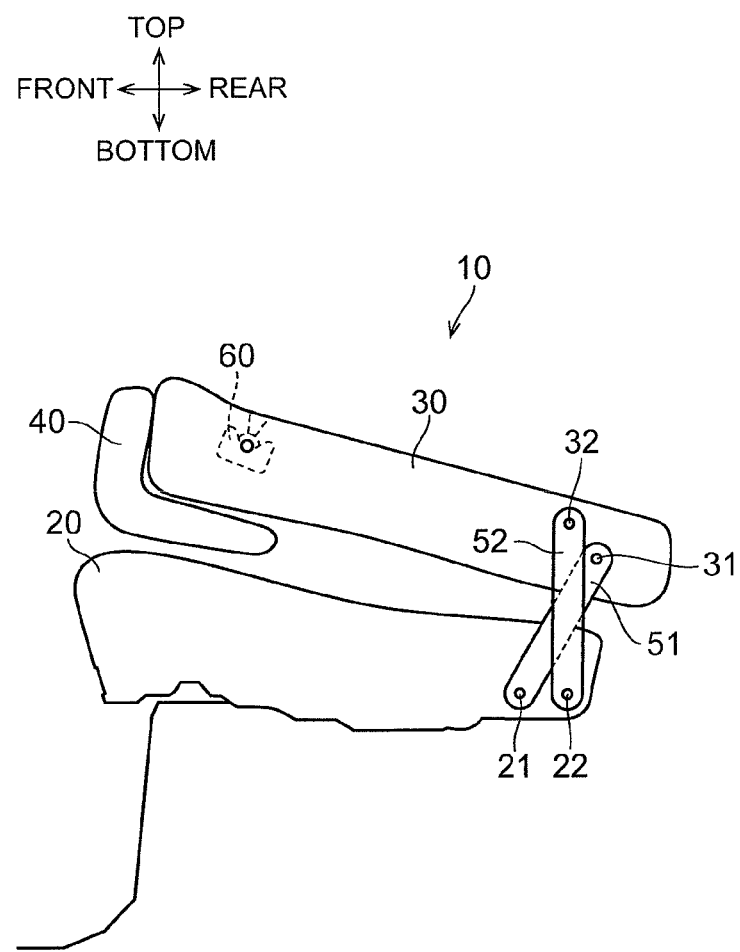
FIG. 4 is a view illustrating a state in which the seat back is laid over the seat cushion.

When the seat back 30 is tilted forward and moved forward from the state shown in FIG. 3, the seat back 30 is laid over the seat cushion 20 as shown in FIG. 4. At this time, the first link member 51 and the second link member 52 intersect with each other. That is, in the state shown in FIG. 3, the position of the support shaft 31 that supports the first link member 51 with respect to the seat back 30 is ahead of the position of the support shaft 32 that supports the second link member 52 with respect to the seat back 30. In contrast, during a process in which the state of the rear seat 10 is changed from the state shown in FIG. 3 to the state shown in FIG. 4, the position of the support shaft 32 is shifted to be ahead of the position of the support shaft 31. When the seat back 30 is laid over the seat cushion 20 and the headrest 40 is removed, a back surface of the seat back 30 is substantially flush with a floor surface of the storage compartment, and thus, the storage compartment is further enlarged.

Although the embodiment has been described, the invention is not limited to the appearance and the configuration described in the embodiment. Various modifications, additions, and deletions may be made to the embodiment without departing from the scope of the invention. For example, although there are provided the striker 62 that maintains the seat back 30 in the normal seating state, and the striker 61 that maintains the seat back 30 in the storage compartment enlargement state, that is, the two strikers are provided as the strikers provided in the vehicle body to be engaged with the lock mechanism provided in the seat back 30 in the embodiment, one or more strikers may be provided between the striker 62 and the striker 61. In this case, the proportions of the size of the storage compartment and the area of the seating surface can be adjusted more finely. Although the lock mechanism is provided in the seat back 30, and the strikers are provided in the vehicle body in the embodiment, the lock mechanism may be provided in the vehicle body, and the strikers may be provided in the seat back 30. Although the invention is applied to the seat for the vehicle in the embodiment, the invention may be applied to a seat provided in, for example, an airplane, a ship, or a train.

What is claimed is:

1. A conveyance seat comprising:
   a seat back;
   a seat cushion;
   a first link member having one end that is attached to one of a floor or a rear portion of the seat cushion such that the first link member is rotatable, and an other end that is attached to a lower portion of the seat back such that the first link member is rotatable; and
   a second link member having one end that is attached to one of the floor or the rear portion of the seat cushion such that the second link member is rotatable, and an other end that is attached to the lower portion of the seat back such that the second link member is rotatable, the second link member being provided in a position behind the first link member, wherein
   one of the floor or the seat cushion is connected to the seat back by the first link member and the second link member,
   the first link member is shorter than the second link member,
   the seat back is configured to be movable in a front-rear direction such that the first link member and the second link member do not intersect with each other,
   the seat back is configured to be folded over the seat cushion such that the first link member and the second link member intersect with each other, and
   a lock device is provided, and the lock device stops a forward rotation movement of the seat back while the seat back is moved in the front-rear direction such that the first link member and the second link member do not intersect with each other.

2. The conveyance seat according to claim 1, wherein the lock device includes a plurality of strikers provided in one of a vehicle body or the seat back, and a lock mechanism that is engaged with each of the plurality of strikers, the lock mechanism being provided in the other one of the vehicle body or the seat back.

3. The conveyance seat according to claim 1, wherein when the seat back is at a normal position, the first link member and the second link member are tilted rearward in a side view in a rearward tilted position, and
when the seat back is moved forward from the normal position and the forward rotation movement of the seat back is stopped by the lock device, the first link member and the second link member are tilted forward in the side view in a forward tilted position.

4. The conveyance seat according to claim 1, wherein the seat back is configured to be movable in the front-rear direction between a normal position and a storage compartment enlargement position at which a seating surface area of the seat cushion is reduced relative to a seating surface area of the seat cushion in the normal position.

5. The conveyance seat according to claim 2, wherein the lock mechanism is provided in an upper portion of the seat back.

6. The conveyance seat according to claim 3, wherein wherein an inclination angle of the seat back is maintained when the first link member and the second link member are tilted from the rearward tilted position to the forward tilted position.

* * * * *